United States Patent Office 2,709,174
Patented May 24, 1955

2,709,174

METHOD OF PREPARING ESTERS OF TITANIC ACID

John B. Rust, Montclair, and Leonard Spialter, Irvington, N. J., assignors, by direct and mesne assignments, of one-half to Montclair Research Corporation, a corporation of New Jersey, and one-half to Ellis-Foster Company, a corporation of New Jersey No Drawing. Application November 16, 1945, Serial No. 629,200

9 Claims. (Cl. 260—429)

This invention relates to esters of titanic acids and particularly the halo-esters thereof, to methods of making the same, as well as derivatives of such esters.

In the customary preparation of titanium esters, titanium tetrachloride is reacted with an organic hydroxyl containing compound, such as an alcohol or phenol. In such reaction a considerable volume of hydrogen chloride is evolved as a by-product and presents a removal and disposal problem. It also in some instances forms double compounds with the titanium ester produced and in at least some cases, the elimination of the acid from such double compound cannot be carried out even with prolonged treatment with alcohol or potassium hydroxide.

It is known that when ethylene oxide or other organic compound containing the epoxy or oxirane configuration is reacted with an organic acyl halide, of the general type RCOCl, beta chloralkyl esters are formed. It is also known that is certain cases when epoxy compounds are brought into contact with inorganic halides, such as aluminum chloride, tin tetrachloride and the like, polymerization of the epoxy compound occurs often very vigorously, with the formation of tarry or resinous substances. In this latter case, the inorganic halides do not react stoichiometrically with the epoxide to form pure isolateable chemical entities, but act instead as polymerization initiators or catalysts. For example, a trace of tin tetrachloride will polymerize a relatively large amount of ethylene oxide. An exception to this catalytic effect has been noted in the case of arsenic trichloride, wherein trichlorethyl arsenite and certain of its intermediates have been prepared.

Among the objects of the present invention is the production of organic esters of titanic acids by relatively simple and inexpensive means, thus obtaining compounds having a variety of commercial and technical applications.

Further objects include the production of halo-esters of titanic acids which are capable of being completely or partially hydrolyzed and condensed to polymeric products suitable for use as film forming materials, binders, impregnants, protective coatings, and the like.

Further objects include the production of titanic esters useful in organic syntheses.

Still further objects include the synthesis of haloalkoxy titanium halides and related compounds.

Still further objects and advantages of the present invention will appear from the more detailed description set forth below, it being understood that this more detailed description is given by way of illustration and explanation only, and not by way of limitation, since various changes therein may be made by those skilled in the art, without departing from the scope and spirit of the present invention.

In accordance with the present invention it has been found that a reaction between epoxy compounds and a titanium halide occurs with great facility, leading to the progressive formation of haloalkyl or haloaryl titanium halides and conditions can be controlled so that little or no by-product resin is produced. The derivatives formed in the process of the present invention are easy to prepare in a short time and are obtained in substantial yields.

The epoxide derivative employed may be an epihydrin or a substituted epihydrin, including the epihydrins and substituted epihydrins of both the alkylene and olefinyl type, and in the substituted derivatives the substituent groups may be organic including aliphatic, aromatic, and carbocyclic non-aromatic, such as alkyl, alkenyl, olefinyl, alkynyl, alicyclic, aryl, arenyl, arynyl, aralkyl, alkaryl, or may be inorganic including halogen such as chlorine, bromine, hydroxyl, etc. The term "alkynyl" means a univalent radical derived from an alkyne. The terms "arenyl" and "arynyl" cover aralkenyl and aralkynyl respectively. As illustrative of such epihydrins there may be mentioned specifically alkylene oxides such as ethylene oxide, propylene oxide, and the like, as well as epichlorhydrin, butadiene monoxide (3,4 epoxybutene-1), styrene oxide, glycidol, etc. The term "epihydrin" is used herein to cover compounds which are the inner anhydrides (ethers) of dihydric alcohols such as glycols.

The titanium derivative employed may be an inorganic halo titanium derivative, or a titanium halide, or a titanium oxyhalide which will be exemplified hereinafter by titanium tetrachloride. But it will be understood that other inorganic titanium halides including polytitanium polyhalides and oxyhalides may be employed. The inorganic titanium halides produce beta haloalkoxy titanium mono-, di-, or tri-halides, or tetra substituted derivatives, where the alkyl group is present or similar related compounds where other organo groups are present, or substituted derivatives thereof depending on the type of epoxide compound employed in the reaction. In addition, alkoxy and aroxy titanium halides and their monohalo-substitution products may be employed for reaction with the epihydrin.

The reaction that takes place may be illustrated by that which takes place between titanium tetrachloride and ethylene oxide, as follows:

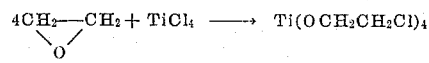

The reactions may occur stepwise along the pattern:

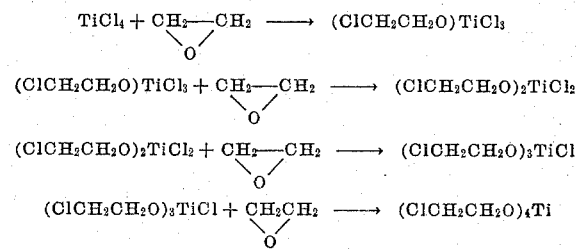

While the invention has been illustrated above by the reaction of an individual epihydrin with an individual titanium halide, mixtures of various reactants may be employed if desired but control of the process is best carried out as further illustrated below in the examples by the use of individual reactants. Nevertheless mixtures of one or more epihydrins may be reacted with one or a mixture of titanium halides of any of the types referred to above, or a single epihydrin may be reacted with a mixture of titanium derivatives.

The reaction involved in the present invention is usually exothermic, sometimes quite substantially so, and consequently the conditions of reaction, including temperature, rate of addition of reactant, etc., are controlled to produce the desired reaction. Usually the reaction zone will be cooled as by means of an ice bath but because of the exothermic reaction involved, refluxing will still take place. With some substituted derivatives the reaction zone may be heated to refluxing temperatures.

The reaction may also be controlled by the use of an organic liquid solvent or diluent, inert to the materials undergoing reaction. Such solvent or diluent may be chosen with the desired boiling point and solvent characteristics for the particular reaction being carried out. The solvent or diluent may be selected, for example, from any one of the following or mixtures thereof: inert hydrocarbons such as petroleum distillates, hexane, such as n-hexane, octane, etc., benzene, toluene, xylene, etc., or the ethers such as diethyl ether, dibutyl ether, anisole, dioxane, or the esters such as ethyl acetate, or ketones, carbon tetrachloride, carbon disulfide, nitrobenzene and the like.

Any desired feasible way of contacting the reactants may be employed depending on their nature and the conditions under which they are reacted. When the epoxide is a gas, such as ethylene oxide, it may be introduced beneath the surface of the titanium halide or its solution in a solvent, as for example, through a sintered ceramic disperser, or as a fine stream of bubbles during efficient stirring. Or the reaction product may be formed continuously by the technique of countercurrent flow, with continuous or discontinuous recovery or removal of reaction product, and with or without recirculation of all or a portion of the reaction mixture through the reaction zone. If a liquid, the epoxide may be slowly added directly, or in one of the solvents referred to above as a diluent, to the titanium halide alone or in solution. Or here too, methods involving countercurrent flow may be used.

The exothermic reaction may be kept under control by one or more of the expedients referred to above as by the use of cooling, or by control of the rate of addition of epoxide, or by the use of the diluent or solvent, or by any combination of such expedients. Where temperatures are employed as explained above under which refluxing takes place, rate of addition of reactant, or use of diluent or solvent, etc., may also be used to control the rate of reaction so as for example, to permit gentle reflux of the solvent or of the titanium halide.

The reaction of the present invention is an addition reaction wherein the epoxide splits at the ring and interposes itself between the titanium and halide atoms. Under properly controlled conditions, no side products are formed and the reaction proceeds smoothly on mixing the reactants. Desired intermediates, such as beta haloalkoxy titanium mono-, di-, or tri-halides may be readily prepared by controlling the ratio of epoxide to the titanium halide. In the formulations given earlier herein to illustrate the stepwise production of derivatives, such representation should not be construed as limiting, since other mechanisms may be involved and isomer formation may occur. In many cases it has been found that mixtures of the possible isomers have been formed. As well as forming the completely reacted esters, the reaction may be interrupted at any desired point in order to obtain the partial esters or an incompletely reacted material which may be desired as an intermediate or for use for other purposes as pointed out hereinabove.

The products formed by reaction of such titanium halide may be generally formulated as

$$Ti.Y_x(OR.Y)_{4-x}$$

where Y is halogen such as chlorine or bromine, R is an alkylene or olefinyl group either substituted or unsubstituted, and $x$ has the value of 0 to 3.

The products of this invention can be used as such as intermediates in the preparation of other titanium derivatives, or they may be put to uses analogous to those of commercial titanium esters. For example, they may be dissolved in solvents and subjected to partial hydrolysis, or they may be directly subjected to hydrolysis, and the partial hydrolytic and condensation products used as protective coatings, impregnants, adhesives, binders, textile treating agents, and the like, or they may be mixed with other organo titanium derivatives and employed in any of the manners set forth.

The following examples illustrate the products and processes of the present invention. All proportions are in parts by volume unless otherwise indicated.

*Example 1.*—Into a glass absorption tower fitted with a glass gas-inlet tube and a reflux condenser topped by a calcium chloride tube to provide anhydrous refluxing conditions, were placed 13.7 parts of titanium tetrachloride and 20 parts of toluene. Through this dark red solution was bubbled gaseous ethylene oxide at a moderately rapid rate. Almost immediately, an exothermic reaction occurred and the solution lightened to a clear orange color, which slowly darkened as the reaction proceeded. After 30 minutes, during which the ethylene oxide was bubbled in at a rate to provide good refluxing of the toluene solvent, brownish flocks began to separate from the solution. After one hour of reaction, the exothermic heat of reaction was noticeably diminishing. The reaction mixture was allowed to stand 16 hours, at the end of which time it had become a homogeneous clear light-brown solution with only a trace of sediment present on the bottom of the reaction vessel. This transparent solution of chloroethyl titanate at this stage weighed 72 parts by weight, indicating a pickup of ethylene oxide amounting to 31 parts by weight; the theoretical pickup is 22 parts by weight or 0.5 mole. The excess pickup may be attributed to solubility. A film of the chloroethyl titanate solution was poured and it air-dried at room conditions within 5 minutes. It hardened and cracked on continued exposure within 10 minutes, due to rapid hydrolysis in moist air.

The toluene solvent was then evaporated off under reduced pressure to give a dark brown viscous syrup. On standing open to the air the syrup soon set to a brown brittle gel.

*Example 2.*—Into the apparatus of Example 1 were placed 55 parts of redistilled titanium tetrachloride, and 80 parts of n-hexane. On introduction of gaseous ethylene oxide, a strongly exothermic reaction occurred with the eventual separation of the solution into two layers; a yellow upper layer and a black tarry lower. Continued addition of ethylene oxide caused a clearing up of the lower layer to a light brown transparent liquid and subsequent merging of both layers into a brown solution-like mixture. On cessation of the exothermic reaction, the flow of ethylene oxide was discontinued and reaction mixture was allowed to cool. On standing, separation into two layers occurred: an upper light yellow layer, and a lower clear brown layer consisting practically of a solution of hexane in chloroethyl titanate.

*Example 3.*—In the apparatus of Example 1 were charged 55 parts of redistilled titanium tetrachloride and 70 parts of benzene. The solution of the light yellow chloride in colorless benzene was clear light-red in color. Within three minutes after the introduction of gaseous ethylene oxide had begun, a strong exothermic reaction started. The flow of ethylene oxide was maintained until the exothermic reaction ceased. The resulting clear light-brown solution of chloroethyl titanate weighed 285 grams. On heating the product on an oil bath and condensing the vapors distilling off, there were recovered 56 parts of benzene. The remaining benzene was tenaciously held in solution even at 180° C., when the product started to darken and turned to a very viscous black tar.

*Example 4.*—Into a 3-neck glass reactor, fitted with a dropping funnel, motor-driven stirrer and reflux condenser topped by a calcium chloride drying tube, was placed 55 parts of titanium tetrachloride. A cooling bath of ice and water was placed under the reaction flask while 0.25 mole of liquid propylene oxide was slowly dropped in over a period of 20 minutes with vigorous stirring.

The ratio of titanium tetrachloride to propylene oxide was 0.5 mole of the former to 0.25 mole of the latter. The yellow titanium tetrachloride turned to a brown fuming liquid with much suspended material, and then slowly solidified to a brown paste which fumed very strongly in moist air. This material was composed of a mixture of unreacted titanium tetrachloride and monochloropropoxy trichloro titanium.

*Example 5.*—Into the apparatus of Example 4 was placed 14.8 parts of titanium tetrachloride and 50 parts of distilled benzene. To this was then added dropwise with vigorous stirring, a solution of 40.4 parts of 3,4-epoxybutene-1 (butadiene monoxide) in 50 parts of distilled benzene. The ratio of titanium tetrachloride to the epoxy derivative was 1/8 mole to 0.5 mole. The reaction vessel was cooled in an ice-water bath during the exothermic reaction. A dark brown non-fuming solution of chlorobutenyl titanate was obtained as the final product.

*Example 6.*—Into the apparatus of Example 4 was charged 27.5 parts of titanium tetrachloride in 50 parts of carbon tetrachloride. Propylene oxide in the ratio of 1.0 mole to each 0.25 mole of titanium tetrachloride was introduced into solution in 50 parts of carbon tetrachloride added dropwise with vigorous stirring over a period of 4 hours. Refluxing of the carbon tetrachloride removed the large exothermic heat of reaction. The product was a dark-brown or black solution of chloropropyl titanate.

A film of the material air-dried at room temperature to a clear film in three minutes. However, formation of a dry skin was noticeable in 30 seconds due to rapid hydrolysis in the moist air. Cracks appeared in the films after 5 minutes.

*Example 7.*—To 13.8 parts of titanium tetrachloride in the reaction apparatus of Example 4 was slowly added, with vigorous stirring over a period of 45 minutes, epichlorohydrin in the ratio of 1/8 mole of epichlorohydrin to 1/8 mole of titanium tetrachloride. During the addition, the reactor was cooled in an ice-water bath but the strong heat of reaction was still noticeable. The product was a light gray fuming pasty solid. It dissolved readily and completely in 25 parts xylene to give a dark red solution of the dichloropropoxy trichlorotitanium which fumed on exposure to moist air.

In the discussion and disclosures given above, reference has been made to the utilization of a titanium halide in carrying out the reaction with epoxy derivatives. Such reaction may be carried out utilizing the titanium halide in admixture with silicon halides to form complex mixtures of complex derivatives because of inter-reactions and co-reactions of the various ingredients. The silicon derivative employed may be an inorganic halo silane or a silicon halide or a silicon oxyhalide including for example, silicon tetrachloride, silicon tetrabromide, silicochloroform, dichlorosilane, monochlorosilane, silicon oxychloride, disilicon hexachloride, and other polysilicon polyhalides and oxyhalides. The inorganic silicon halides of themselves produce beta halo alkoxy silicon mono-, di-, or tri-halides or substituted derivatives thereof depending on the type of epoxide compound employed in the reaction. Organo substituted silicon halides may be employed in combination with the titanium halides in which substituted silicon halides the substituent organic group may be selected from the organic radicals mentioned above and may be illustrated by the alkyl silicon halides. The organo silicon halides give derivatives of halo alkoxy alkyl silicon type when they are reacted alone with the epoxy compound but as stated above when mixtures of the silicon halide and titanium halide are employed, very complex mixtures of several types of derivatives are produced. The reaction conditions for utilizing mixtures of silicon halides with titanium halides are substantially the same as those discussed above in connection with the specific examples in producing the titanium derivative. The various conditions there set forth for control of the reaction by the use of liquid solvents or diluents, etc., may also be applied to the production of the complexes where both silicon halides and titanium halides are reacted. The mixed derivatives produced may be subjected to hydrolysis in the manner described above to further produce hydrolytic or hydrolyzed derivatives of complex character which may be utilized for various purposes. The proportions of the titanium halide to the silicon halide derivatives employed may vary depending on the nature of the reaction product and its ultimate properties desired. Where the amounts of the titanium halides are substantially less than those of the silicon halides employed in the reaction, the titanium derivatives tend to modify the properties of the silicon halide derivatives, whereas when the titanium derivatives exceed substantially the amount of the silicon derivatives present, it is the titanium derivatives which give the fundamental character to the derivatives ultimately produced, depending, of course, on the proportions employed.

While the utilization of mixtures of silicon halides and titanium halides has been set forth above in carrying out the reactions, it is possible also to carry out the reaction with the silicon halide and the epoxy derivative and subsequently mix such derivatives which are produced with the compounds obtained by the reaction of the titanium halide with the epoxy derivative, proportions being utilized to produce the desired properties in the resulting product and then utilizing such mixtures as such for the purposes set forth herein, while subjecting them to hydrolysis or partial hydrolysis for utilization. Various expedients in this direction can be employed.

Having thus set forth our invention, we claim:

1. The method of preparing halo esters of titanic acids which comprises reacting titanium tetrachloride with an epoxyalkane.

2. The method of preparing halo esters of titanic acids which comprises reacting titanium tetrachloride with ethylene oxide while cooling the reaction mixture.

3. The method of preparing halo esters of titanic acids which comprises reacting titanium tetrachloride with propylene oxide while cooling the reaction mixture.

4. A method of preparing a titanium ester which comprises reacting an epoxyalkane with a titanium tetrahalide.

5. A method of preparing a titanium ester which comprises reacting a 1,2 monoepoxide with a titanium tetrachloride.

6. A method of preparing a titanium ester which comprises reacting butadiene monoxide with titanium tetrachloride.

7. A method of preparing a titanium ester which comprises reacting an epoxyalkene with a titanium tetrahalide.

8. A method of preparing a titanium ester which comprises reacting an epoxyalkene with titanium tetrachloride.

9. A method of preparing a titanium compound, which comprises reacting a 1,2-monoepoxide with a titanium tetrahalide.

References Cited in the file of this patent
UNITED STATES PATENTS

| Number | Name | Date |
|---|---|---|
| 1,944,274 | Salzberg | Jan. 23, 1934 |
| 2,160,273 | Loane et al. | May 30, 1939 |
| 2,224,359 | Rosenblum | Dec. 10, 1940 |
| 2,242,400 | Loane et al. | May 20, 1941 |
| 2,258,718 | Rothrock | Oct. 14, 1941 |
| 2,381,137 | Patnode et al. | Aug. 7, 1945 |
| 2,381,138 | Patnode et al. | Aug. 7, 1945 |

FOREIGN PATENTS

| Number | Country | Date |
|---|---|---|
| 512,452 | Great Britain | Sept. 15, 1939 |
| 582,412 | France | Sept. 12, 1923 |

OTHER REFERENCES

Malinovske: J. Gen. Chem. (USSR), 10 (1940), pp. 1918–22.